United States Patent
Louboutin

(10) Patent No.: US 10,390,062 B2
(45) Date of Patent: Aug. 20, 2019

(54) RECOMMENDING CONTENT BASED ON USER BEHAVIOR TRACKING AND ANALYSIS

(71) Applicant: Roku, Inc., Los Gatos, CA (US)

(72) Inventor: Sylvain René Yves Louboutin, Sunnyvale, CA (US)

(73) Assignee: ROKU, INC., Los Gatos, CA (US)

( * ) Notice: Subject to any disclaimer, the term of this patent is extended or adjusted under 35 U.S.C. 154(b) by 0 days.

(21) Appl. No.: 15/357,289

(22) Filed: Nov. 21, 2016

(65) Prior Publication Data

US 2018/0146253 A1   May 24, 2018

(51) Int. Cl.

| | |
|---|---|
| H04N 21/25 | (2011.01) |
| H04L 12/26 | (2006.01) |
| H04L 29/08 | (2006.01) |
| H04N 21/442 | (2011.01) |
| H04N 21/45 | (2011.01) |
| H04N 21/466 | (2011.01) |
| H04N 21/81 | (2011.01) |

(Continued)

(52) U.S. Cl.
CPC ....... H04N 21/251 (2013.01); G06F 11/3438 (2013.01); G06Q 30/0201 (2013.01); H04L 43/045 (2013.01); H04L 67/22 (2013.01); H04N 21/44213 (2013.01); H04N 21/4532 (2013.01); H04N 21/4667 (2013.01); H04N 21/4668 (2013.01); H04N 21/812 (2013.01)

(58) Field of Classification Search
CPC ......... H04N 21/4668; H04N 21/44213; H04N 21/4532; H04N 21/4667; H04N 21/812; H04L 43/045; H04L 67/22
See application file for complete search history.

(56) References Cited

U.S. PATENT DOCUMENTS

| | | | | |
|---|---|---|---|---|
| 8,321,556 B1 * | 11/2012 | Chatterjee | ............... | H04L 12/44 455/2.01 |
| 2011/0202821 A1 * | 8/2011 | Roy | ....................... | G06Q 30/02 715/201 |

(Continued)

*Primary Examiner* — Pankaj Kumar
*Assistant Examiner* — Alexander Boyd
(74) *Attorney, Agent, or Firm* — Sterne, Kessler, Goldstein & Fox P.L.L.C.

(57) ABSTRACT

Disclosed herein are system, apparatus, article of manufacture, method and/or computer program product embodiments, and/or combinations and sub-combinations thereof, for grouping users into user clusters based on common behavior patterns, and then recommending content to the users based on their respective membership in the clusters. Some embodiments operate by receiving tracking data for a user, where the tracking data includes content viewing behavior information of the user, and/or user interface (UI) navigation behavior information of the user. A distance between the tracking data and a cluster profile associated with a user cluster is determined. If the distance satisfies a threshold associated with the user cluster, then the user is added to the user cluster. Thereafter, the user's view experience is customized based the user's membership in the user cluster. For example, content recommendations may be generated for the user based on content previously provided to other users in the user cluster, where such content may or may not have previously been provided to the user.

16 Claims, 17 Drawing Sheets

(51) Int. Cl.
    *G06F 11/34*    (2006.01)
    *G06Q 30/02*    (2012.01)

(56) References Cited

U.S. PATENT DOCUMENTS

| | | | |
|---|---|---|---|
| 2015/0142828 A1* | 5/2015 | Nguyen | G06F 17/30734 |
| | | | 707/749 |
| 2015/0213463 A1* | 7/2015 | Turner | G06Q 30/0201 |
| | | | 705/7.33 |
| 2016/0274744 A1* | 9/2016 | Neumann | H04N 21/252 |
| 2016/0291921 A1* | 10/2016 | Miller | H04N 21/4788 |

* cited by examiner

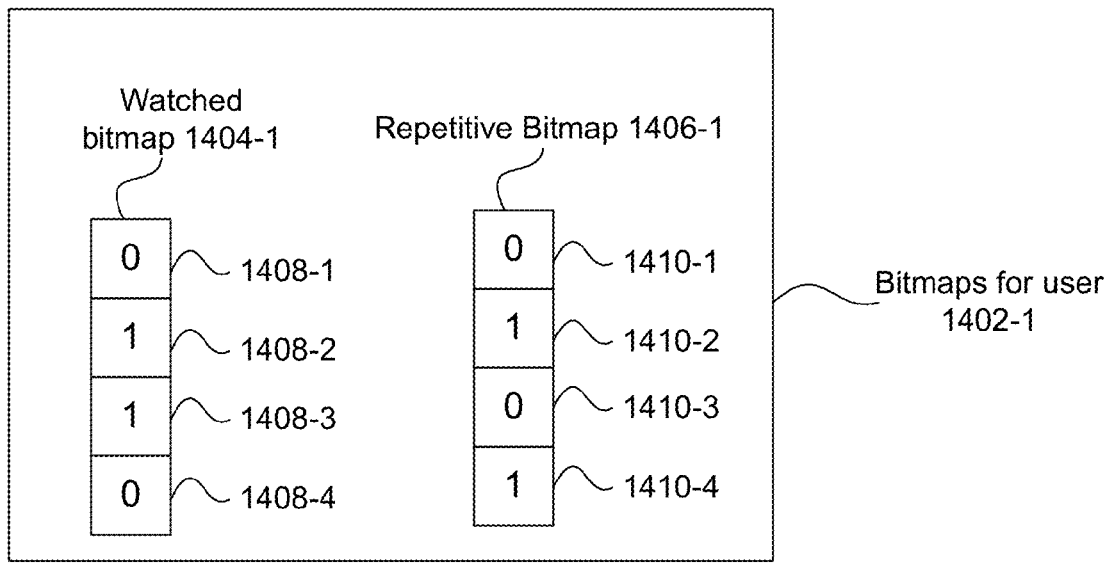
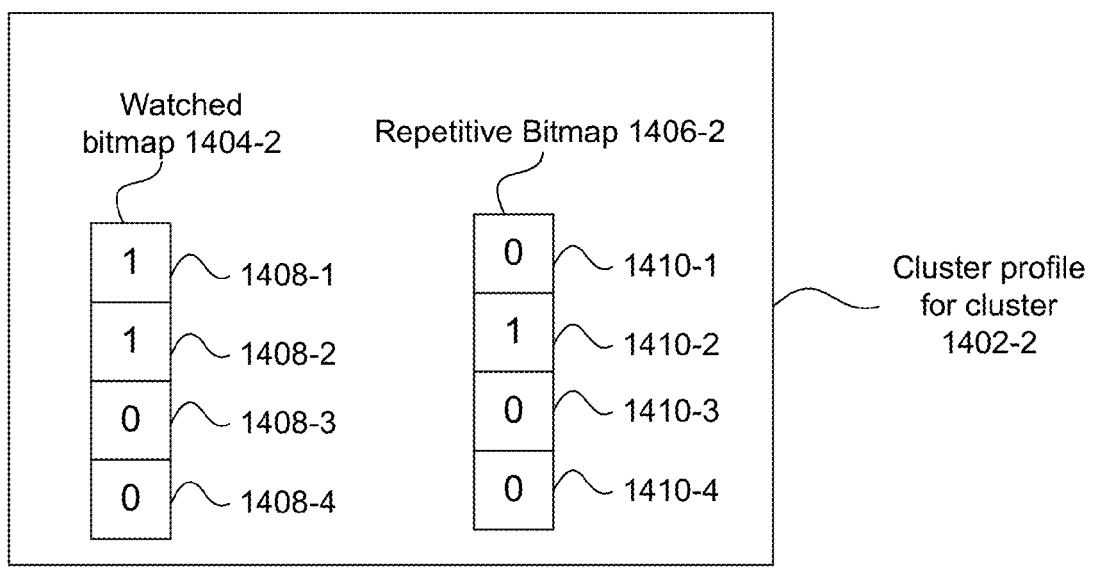
FIG. 14

RECOMMENDING CONTENT BASED ON USER BEHAVIOR TRACKING AND ANALYSIS

BACKGROUND

Field

This disclosure is generally directed to recommending content for a user based on user behavior tracking and analysis.

Background

In today's world, there is practically a limitless amount of online content available for users to view and enjoy, such as music, movies, TV programs, images, games, software, to name just a few examples. Given this near infinite repository of online content, it can take considerable time and effort for a user to navigate through a complex, sometimes multi-dimensional menu structure to locate content she wishes to view or otherwise experience. Some systems attempt to recommend content to users, to help target their browsing and searching to a limited subset of all content available. But, such recommendations have varied usefulness.

SUMMARY

Provided herein are system, apparatus, article of manufacture, method and/or computer program product embodiments, and/or combinations and sub-combinations thereof, for grouping users into user clusters based on common behavior patterns, and then recommending content to the users based on their respective membership in the clusters.

Some embodiments operate by receiving tracking data for a user, where the tracking data includes content viewing behavior information of the user, and/or user interface (UI) navigation behavior information of the user. A distance between the tracking data and a cluster profile associated with a user cluster is determined. If the distance satisfies a threshold associated with the user cluster, then the user is added to the user cluster. Thereafter, the user's viewing experience is customized based the user's membership in the user cluster. For example, content recommendations may be generated for the user based on content previously provided to other users in the user cluster, where such content may or may not have previously been provided to the user.

BRIEF DESCRIPTION OF THE FIGURES

The accompanying drawings are incorporated herein and form a part of the specification.

FIG. 14 illustrates example bit map data structures for storing data from tracking and logging of viewing patterns for a user and a cluster profile, according to some embodiments.

Figure 1:
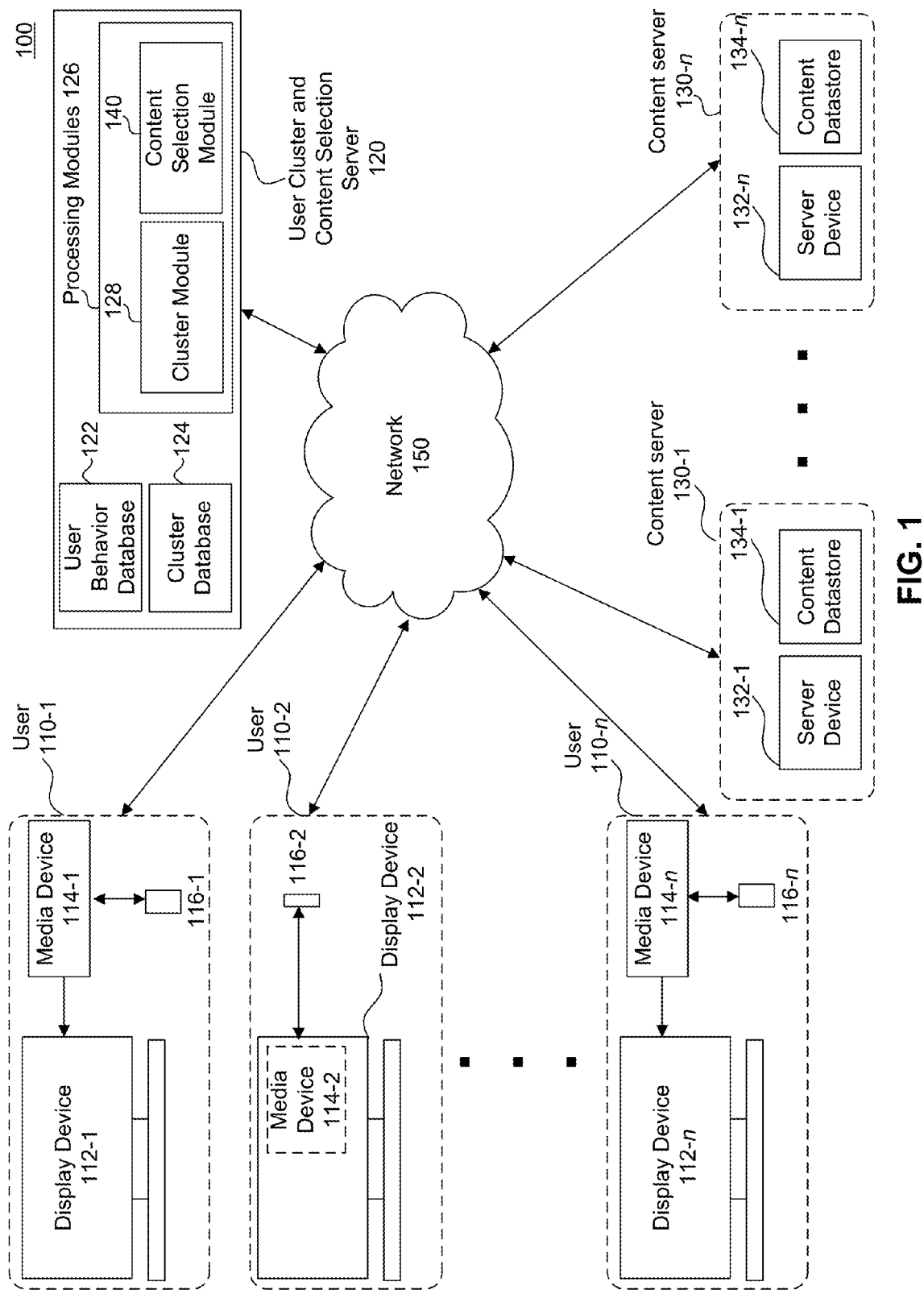
FIG. 1 illustrates a block diagram of a media system that includes a user cluster and content selection server, according to some embodiments.

Like reference numerals refer to corresponding parts throughout the several views of the drawings. Additionally, generally, the left-most digit(s) of a reference number identifies the drawing in which the reference number first appears. Furthermore, one or more designators to the right of a reference number such as, for example, "m" and "n" and other similar designators are intended to be variables representing any positive integer. Thus, for example, if an implementation sets a value for n=4, then a complete set of elements 114-$n$ can include elements 114-1, 114-2, 114-3, and 114-4. Furthermore, unless explicitly stated otherwise, a complete set of elements can vary for a given feature, embodiment, and/or implementation even though the same designator can be used between various features, embodiments, and/or implementations.

DETAILED DESCRIPTION

FIG. 1 illustrates a block diagram of a media system 100, according to some embodiments. The media system 100 may include one or more user systems 110, an user cluster and content selection server 120, and one or more content servers 130. In some embodiments, the user systems 110 can include, without limitation, display devices 112 (e.g. a monitor, television, a projector, etc.), media devices 114 (e.g. streaming devices, multimedia devices, audio/video playback devices, etc.) and remote control devices 116. Remote control devices 116 can be any component, part, apparatus or method for controlling media device 114 and/or display device 112, such as a remote control, a tablet, laptop computer, smartphone, on-screen controls, integrated control buttons, or any combination thereof, to name just a few examples.

In some embodiments, the media devices 114 can be a part of, integrated with, operatively coupled to, and/or connected to their respective display devices 112. The media devices 114 can be configured to communicate with network 150. In various embodiments, the network 150 can include, without limitation, wired and/or wireless intranet, extranet, Internet, cellular, Bluetooth and/or any other local, regional, global communications network, as well as any combination thereof.

In some embodiments, the content servers 130 can include one or more content server devices 132 and associated content datastores 134. The content stored within the content datastores 134 may include music, videos, movies, TV programs, multimedia, images, still pictures, text, graphics, gaming applications, advertisements, software, and/or any other content.

Figure 2:
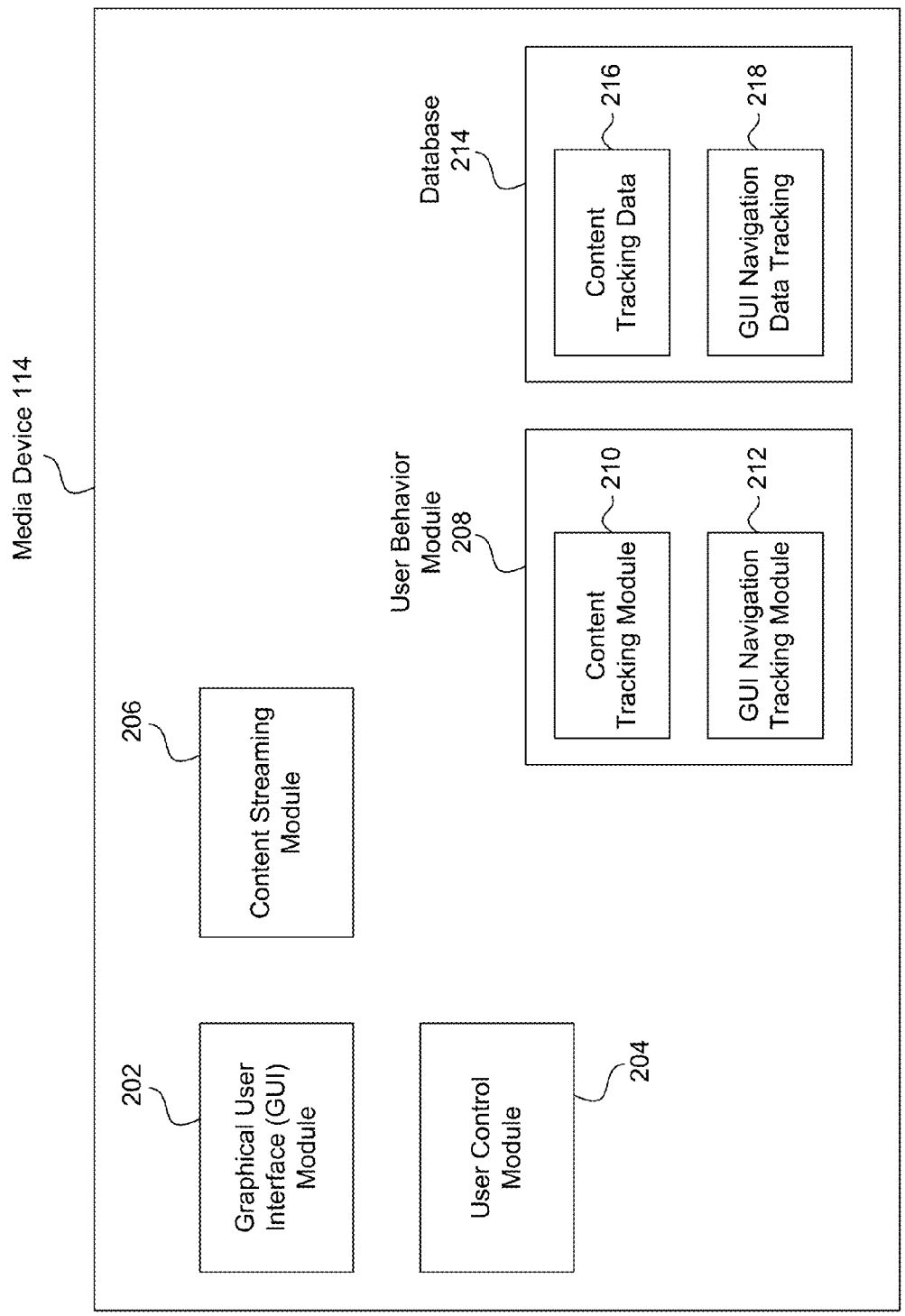
FIG. 2 illustrates a block diagram of a media device, according to some embodiments.

As shown in FIG. 2, media device 114 may include a graphical user interface (GUI) module 202, a user control module 204, a content streaming module 206, a user behavior module 208 and a database 214.

Operationally, in some embodiments, the GUI module 202 of a media device 114-1 may display on an associated display device 112-1 a menu of content that may be selected by an associated user for presentation. The menu may have multiple dimensions and levels. The user may navigate through the menu using remote control 116-1, which may interact with user control module 204 in the media device 114-1. By navigating through the menu using remote control 116-1, the user may locate and select content he wishes to view or otherwise experience (such as listen to music, look at images, play games or software, etc.). This selection may be received by user control module 204 in the media device 114-1. User control module 204 may transmit this user selection to content streaming module 206. In response, content streaming module 206 may interact with one or more content servers 130 to request the selected content. In response, content server(s) 130 may transmit the requested content from the content datastore(s) 134 to the content streaming module 206 of the media device 114-1 via the network 150. The media device 114-1 may then display or otherwise present the received content using display device 112-1 to the user.

In today's world, there is practically a limitless amount of online content available for users to view and enjoy. Given this near infinite repository of available content, it could take considerable time and effort for a user to navigate through a complex, sometimes multi-tier and multi-dimensional menu structure to locate content he wishes to view or otherwise experience.

Accordingly, in some embodiments, a user is monitored while using the media device 114 to obtain user behavioral information. Such behavioral information is used to profile the user. The user's profile is then used to select content to recommend to the user. By doing so, it is more likely the user will need less time and effort to navigate the menu structure to locate and select content he wishes to view or otherwise display.

According to some embodiments, users are clustered into groups based on common behavior patterns. A user in a particular cluster may then be offered content that was previously viewed by other users in the cluster. By doing so, it is more likely the menu of content offered to the user on display device 112 will include content selections better aligned with the user's interests.

According to some embodiments, users may be clustered into groups based on tracking and analysis of their content viewing patterns (or, more generally, their content consumption patterns). As further described below, user cluster and content selection server 120 may monitor and track those sections/portions of a particular content (such as a particular movie) that were presented to the user on display device 112. The user cluster and content selection server 120 may also track those sections/portions of the content that were skipped by the user, as well as those sections/portions that were watched multiple times. Such information may represent the user's viewing behavior. The user cluster and content selection server 120 may then cluster users into groups based on their content viewing behavior.

Additionally or alternatively, in some embodiments, users may be clustered into groups based on user interface (UI) browsing behavior patterns. As further described below, user cluster and content selection server 120 may monitor and track how a user navigates through the menu structure where content is listed for selection. For example, user cluster and content selection server 120 may track behavioral characteristics such as: (1) the order in which icons/tiles/options are navigated; (2) icons/tiles/options over which the user lingered; icons/tiles/options that the user visited multiple times during a session; and/or (4) icons that the user clicked (these examples are provided for illustrative purposes only and are not limiting; any other UI navigational characteristic may also or alternatively be tracked by user cluster and content selection server 120). The user cluster and content selection server 120 may then cluster users into groups based on their UI navigation behavior patterns.

As shown in FIG. 1, the user cluster and content selection server 120 may include a user behavior database 122 that stores user behavior data. In embodiments, such user behavior data may include user content viewing behavior data and/or user UI navigation behavior data.

The user cluster and content selection server 120 may include processing modules 126 such as a cluster module 128 and a content selection module 140. In embodiments, the cluster module 128 may cluster users into groups based on user behavior data stored in the user behavior database 122. Such user behavior data may be collected at media devices 114 by user behavior modules 208 that include content tracking module 210 and GUI navigation tracking module 212, and may be stored in databases 214 that include content tracking data 216 and GUI navigation tracking data 218 (see FIG. 2).

Figure 3:
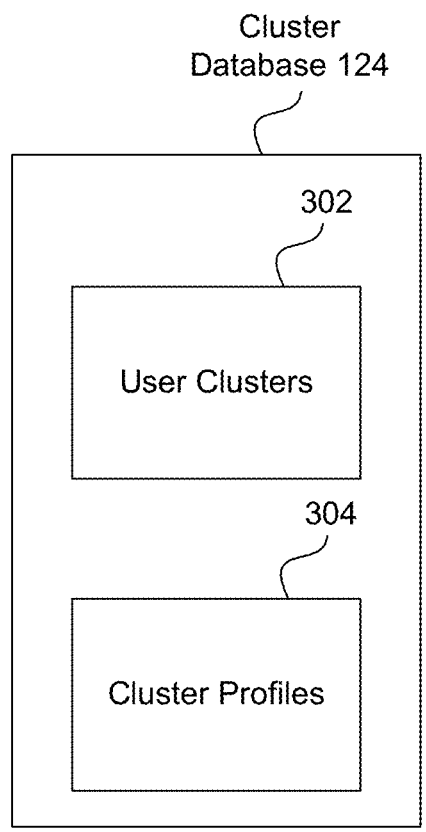
FIG. 3 illustrates a cluster database in the user cluster and content selection server, according to some embodiments.

As shown in FIG. 3, listings of user clusters (that is, a list of the users in each of the clusters) 302 may be stored in a cluster database 124 of the user cluster and content selection server 120. The content selection module 140 may select content to recommend to a particular user based on the user's membership in particular clusters.

In some embodiments, each cluster 302 has a representative cluster profile 304. When determining whether a particular user should be in a particular cluster, the cluster module 128 may compare the user's behavioral information with the cluster profile 304 associated with the cluster 302. As further described below, a given cluster profile 304 may be generated based on the associated behavior information of one or more users who are members of the cluster 302. Cluster profiles 304 may be stored in the cluster database 124 of the user cluster and content selection server 120.

Figure 4:
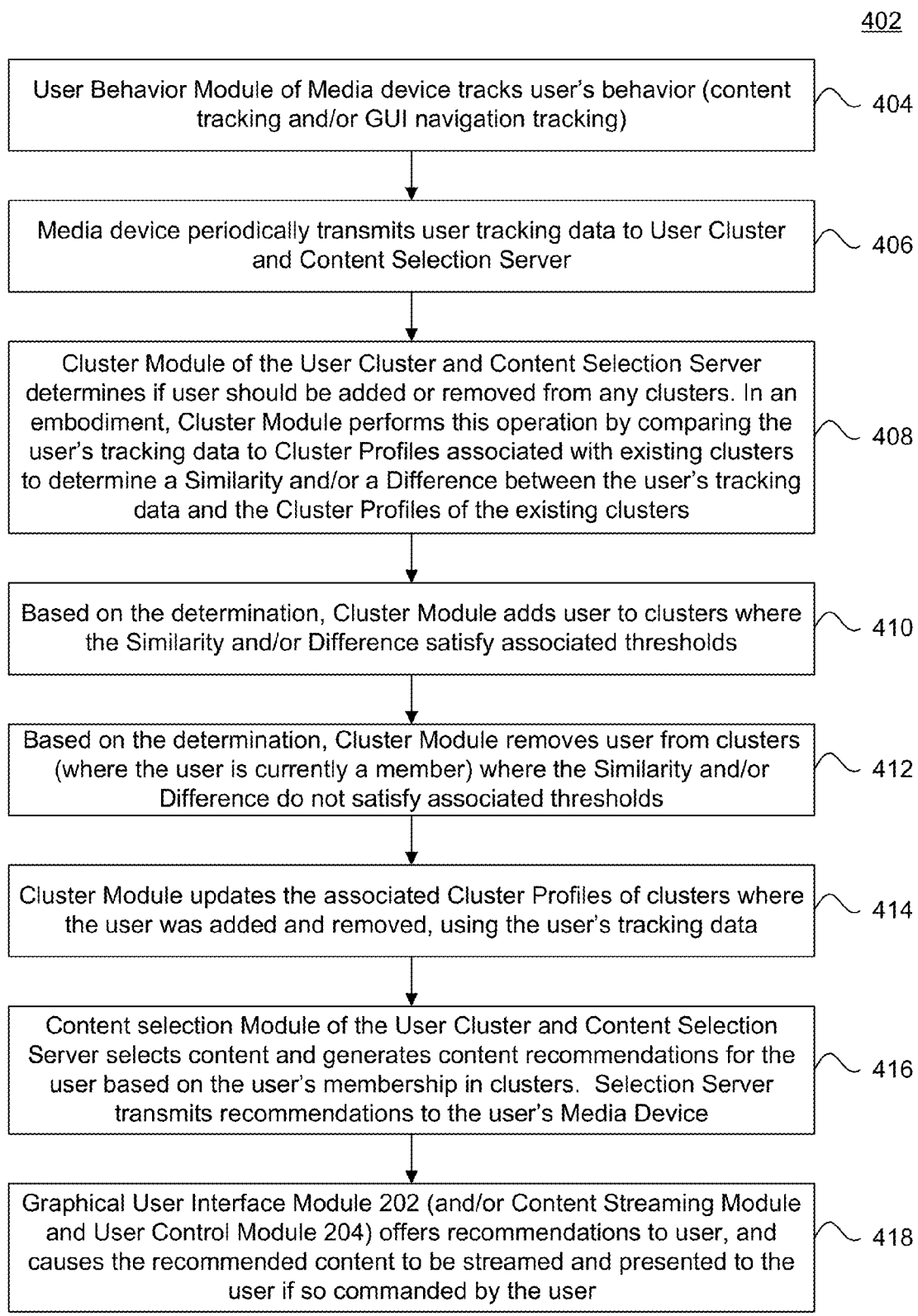
FIG. 4 illustrates a method for recommending content for streaming to a user based on user behavior tracking, analysis and clustering, according to some embodiments.

FIG. 4 illustrates a method 402 for selecting and recommending content for streaming to a user based on user behavior tracking, analysis and clustering, according to some embodiments.

In 404, user behavior module(s) 208 of media device 114 may track a user's behavior as he uses media device 114. For example, content tracking module 210 may track the user's behavior as he watches a movie or other content, and/or as the user navigates through the graphical user interface (GUI). The content tracking module 210 may store such content tracking data 216 in databases 214.

Element 404—Tracking User Content Viewing Patterns

Figure 5:
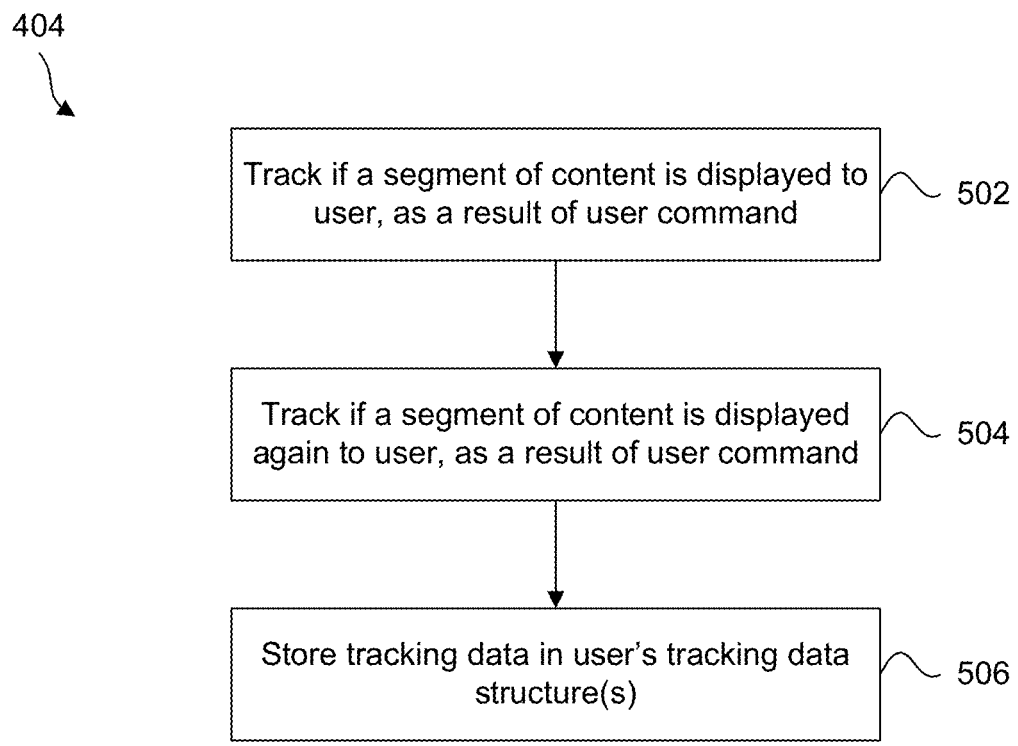
FIG. 5 illustrates a method for fine grain tracking and logging of user viewing patterns, according to some embodiments.

FIG. 5 illustrates 404 in greater detail, according to some embodiments where user viewing patterns are tracked. In 502, contact tracking module 210 may keep track of the segments of a content (such as a movie) that are displayed on display device 112. For example, a movie may be segmented into 5 minute intervals, or 1 minute intervals, or some other interval. With greater segmentation (for example, a 1 minute interval rather than a 10 minute interval), embodiments are able to achieve finer grain logging of user viewing patterns. The number of segments and/or segment length may be user or system controlled. In 502, the contact tracking module 210 may keep track of which segments of the movie are displayed on the display device 112.

In embodiments, users may use remote control 116 to repeat the display of segments of a movie or other content. For example, a user may press the Rewind button on remote control 116, or use the remote control 116 to select a "Re-Watch Last 30 Seconds Feature." In 504, the contact tracking module 210 may keep track of the segments of a movie or other content that are displayed more than once on display device 112. In embodiments, the contact tracking module 210 in 504 keeps track of the number of times a segment of a movie or other content is displayed on display device 112.

In 506, the contact tracking module 210 may store the content tracking data 216 obtained in 502 and 504 in tracking data structure(s) associated with the user. In some embodiments, bitmapped data structure(s) and/or tree data structure(s) are used in 506 to store the content tracking data 216.

Bitmap Content Tracking Data Structure

Figure 6:
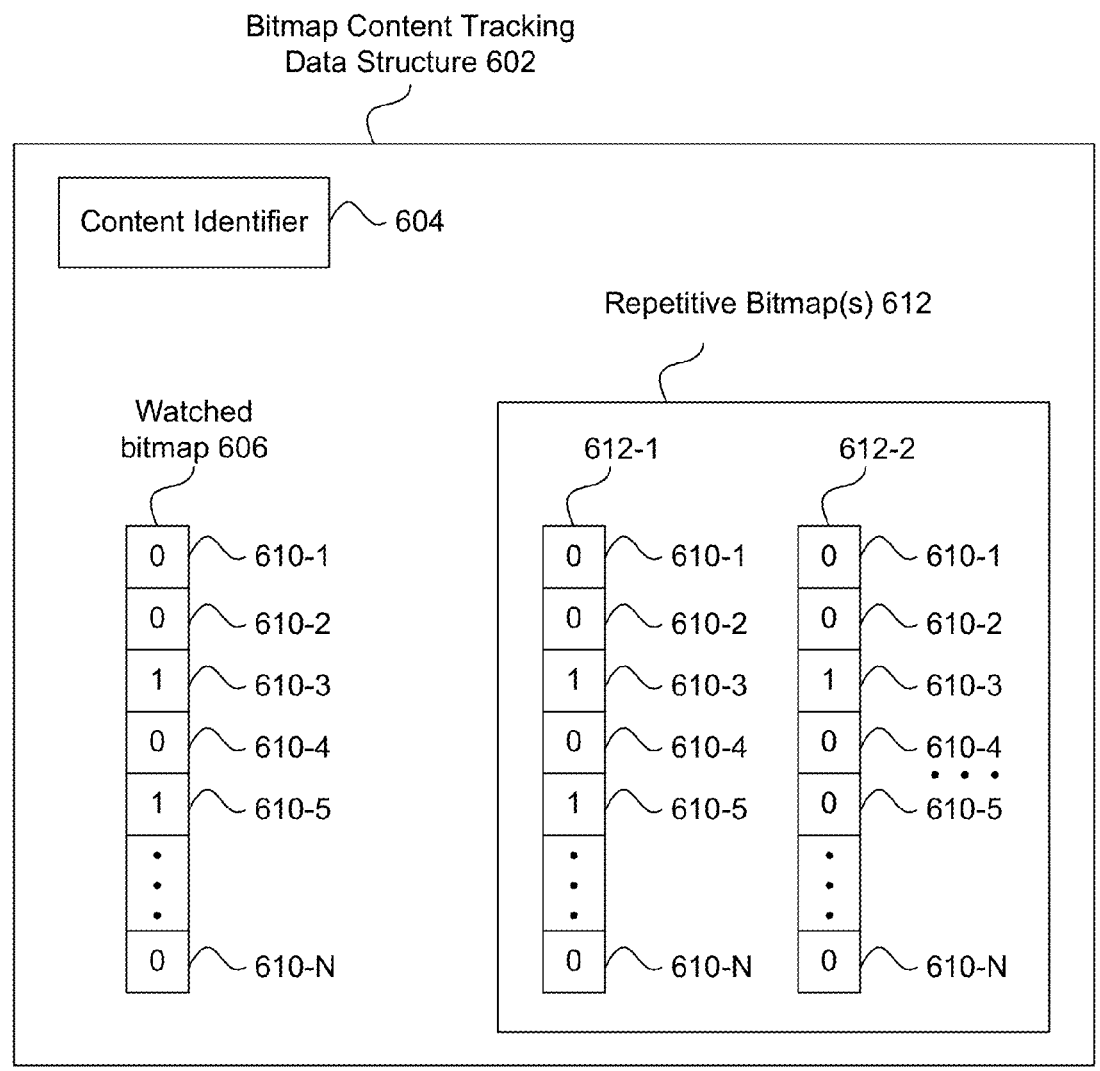
FIG. 6 illustrates an example bit map data structure for storing data from tracking and logging of user viewing patterns, according to some embodiments.

FIG. 6 illustrates an example content tracking data structure 602 that comprises a content identifier 604, a watched bitmap 606, and zero or more repetition bitmaps 612. The content identifier 604 may be information that uniquely identifies the content being displayed on display device 112. The content identifier 604 may be, for example, an alphanumeric string that is uniquely assigned to the content. In embodiments, the content identifier 604 is not generated based on any characteristics of the content (such as the title of the content); accordingly, the logging of user view patterns as discussed herein is better anonymized.

In some embodiments, the watched bitmap 606 includes N columns 610 of bits, where N is an integer corresponding to the segmentation of the content. For example, if a one hour movie has been segmented into 1 minute segments, then N would be equal to 60.

The width of bitmap 606 (as well as trees, described below) may be variable or fixed. A bitmap 606 is variable if segmentation is set according to a fixed time interval. For example, if the tracking time interval is 1 minute and the content is 120 minutes, then the width is 120; if the content is 180 minutes, then the width is 180.

The width of bitmap 606 may instead be fixed, in which case the length of the tracking interval is variable. For example, if the width is fixed to 16 and the content is 32 minutes, then each interval is 2 minutes. If the content is 64 minutes, then each interval is 4 minutes.

In some embodiments, a bit in bitmap 1602 is set to 1 if the corresponding segment—or at least part of it—has been display to the user on the user's display device 112. If the segment has not been displayed at all—that is, it has been skipped entirely—then the bit is set to 0.

Referring back to FIG. 5, in 506, contact tracking module 210 may set a bit of watched bitmap 606 to 1 if the segment of the content corresponding to that bit was displayed on display device 112. If the segment was not displayed, contact tracking module 210 may set the bit to 0. For example, the watched bitmap 606 of FIG. 6 shows that segments 3 and 5 were set to 1, indicating they were displayed on display device 112.

The repetition bitmaps 608 record whether a segment of content was displayed more than once on display device 112. Each repetition bitmap 612 includes N bits. Again, N is an integer corresponding to the segmentation of the content. If contact tracking module 210 determines that a segment of the content was displayed again on display device 112, then it creates a repetition bitmap 612-1 (if one does not already exist), and stores a 1 in the corresponding bit. If a 1 already exists in that bit, then the contact tracking module 210 creates another repetition bitmap 612-2 and stores a 1 in the corresponding bit. This process continues each time a segment of content is displayed again on display device 112.

For example, in FIG. 6, repetition bitmap 612-1 indicates that segments 3 and 5 of the movie were each displayed a second time on display device 112 because their corresponding bits 610-3 and 610-5 are set to 1. Assume segment 3 is displayed a third time on display device 112. In that case, contact tracking module 210 in 506 would attempt to store a 1 in the corresponding bit 610-3 of the existing repetition bitmap, that is, repetition bitmap 612-1. But contact tracking module 210 would find that bit 610-3 in repetition bitmap 612-1 is already set to 1. Accordingly, contact tracking module 210 would create a new repetition bitmap 612-2, and store a 1 in the corresponding bit 610-3 of the newly created repetition bitmap 612-2.

Tree Content Tracking Data Structure

Figure 7:
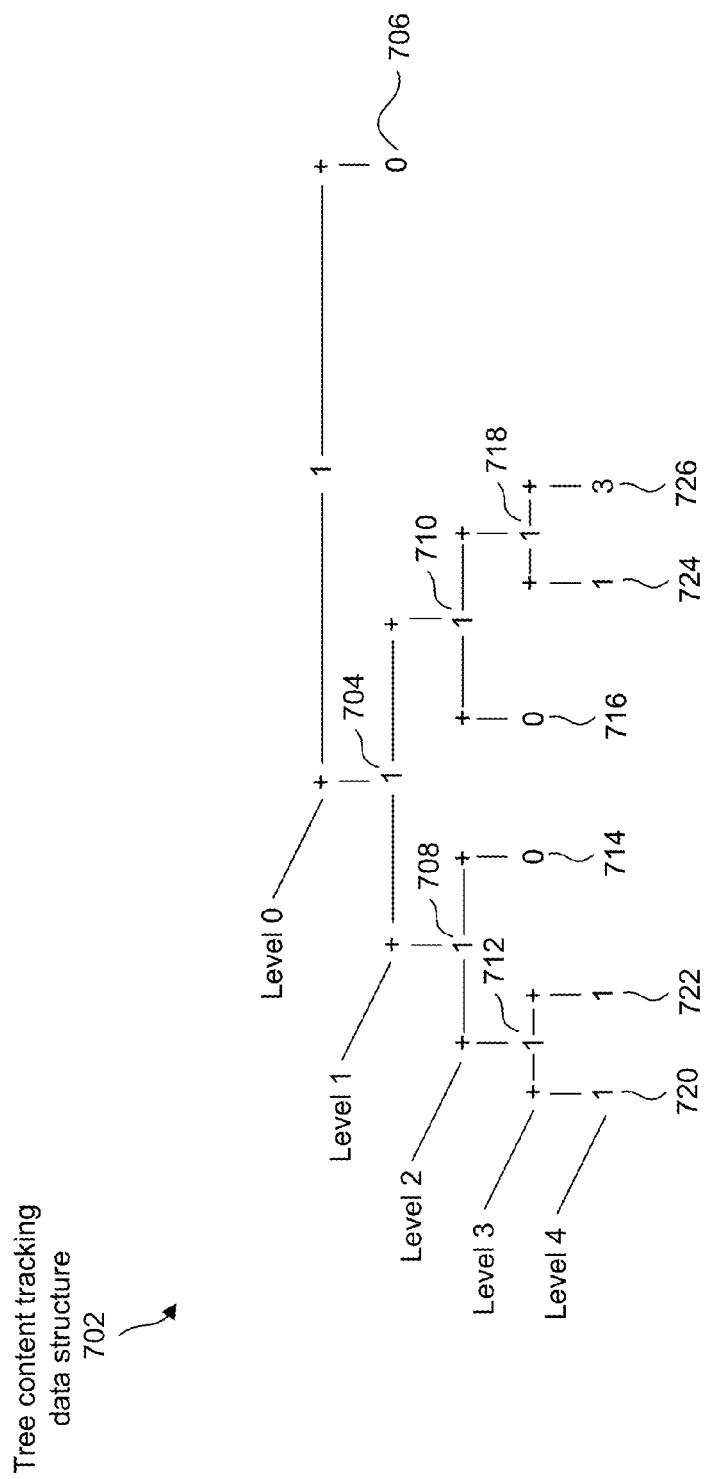
FIG. 7 illustrates an example tree data structure for storing data from tracking and logging of user viewing patterns, according to some embodiments.

Alternatively or in addition to the bitmap data structure 602 of FIG. 2, cluster module 124 may use a tree data structure to record the segments of a content (such as a movie) displayed to the user. FIG. 7 illustrates an example tree data structure 702. In some embodiments, the tree 702 has n levels, where $n=1+\log_2 m$, where m equals the number of segments in the content being tracked. For example, assume the content is a video that is 32 minutes long, and it is desired to track the user's viewing pattern in 2 minute intervals such that the video has 16 segments. In that case, as shown in the example of FIG. 7, $n=1+\log_2 16=5$ levels (shown in FIG. 7 as levels 0-4).

Figure 15:
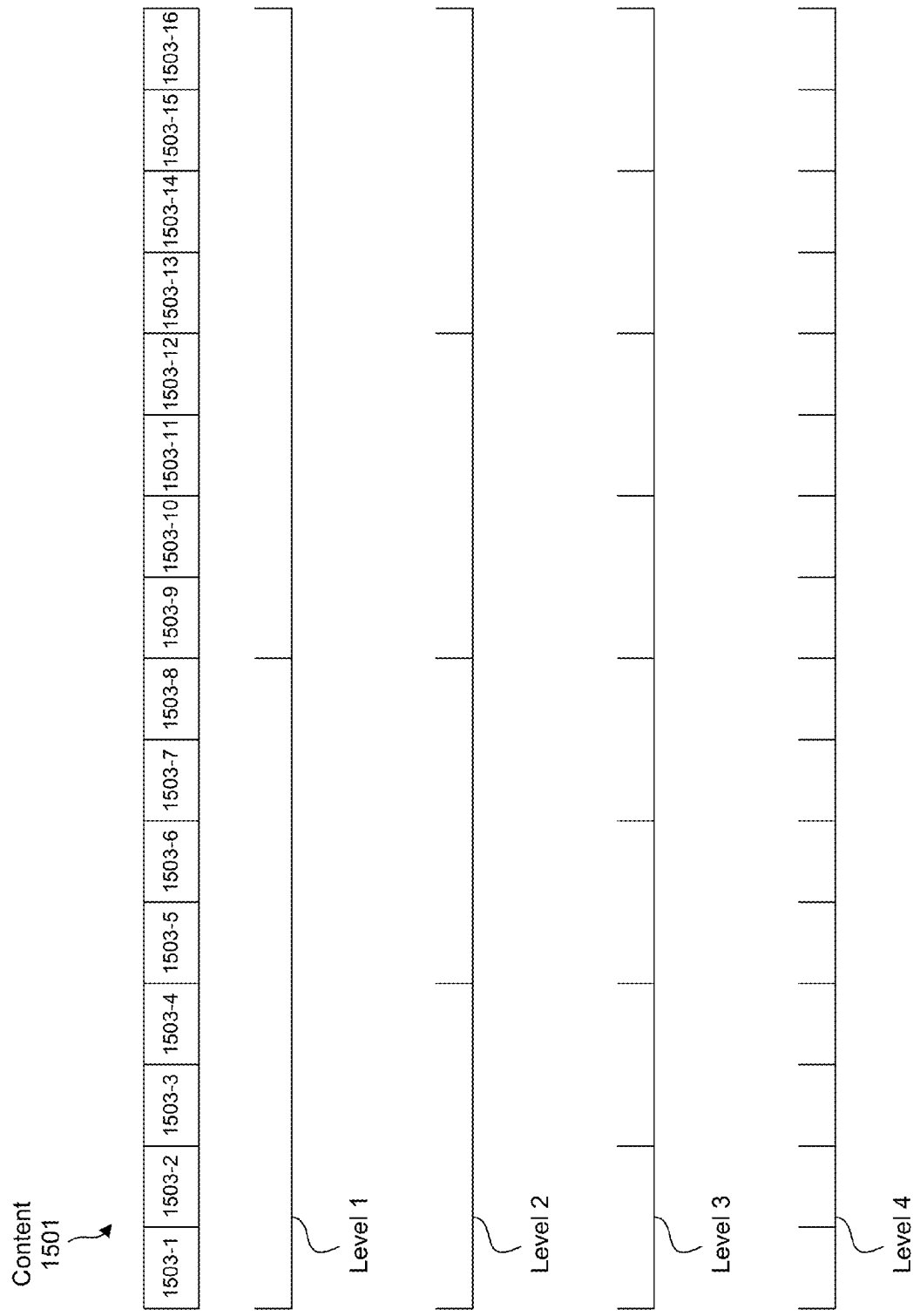
FIG. 15 illustrates an example content used to describe the example tree content tracking data structure of FIG. 7, according to some embodiments.
Figure 16:
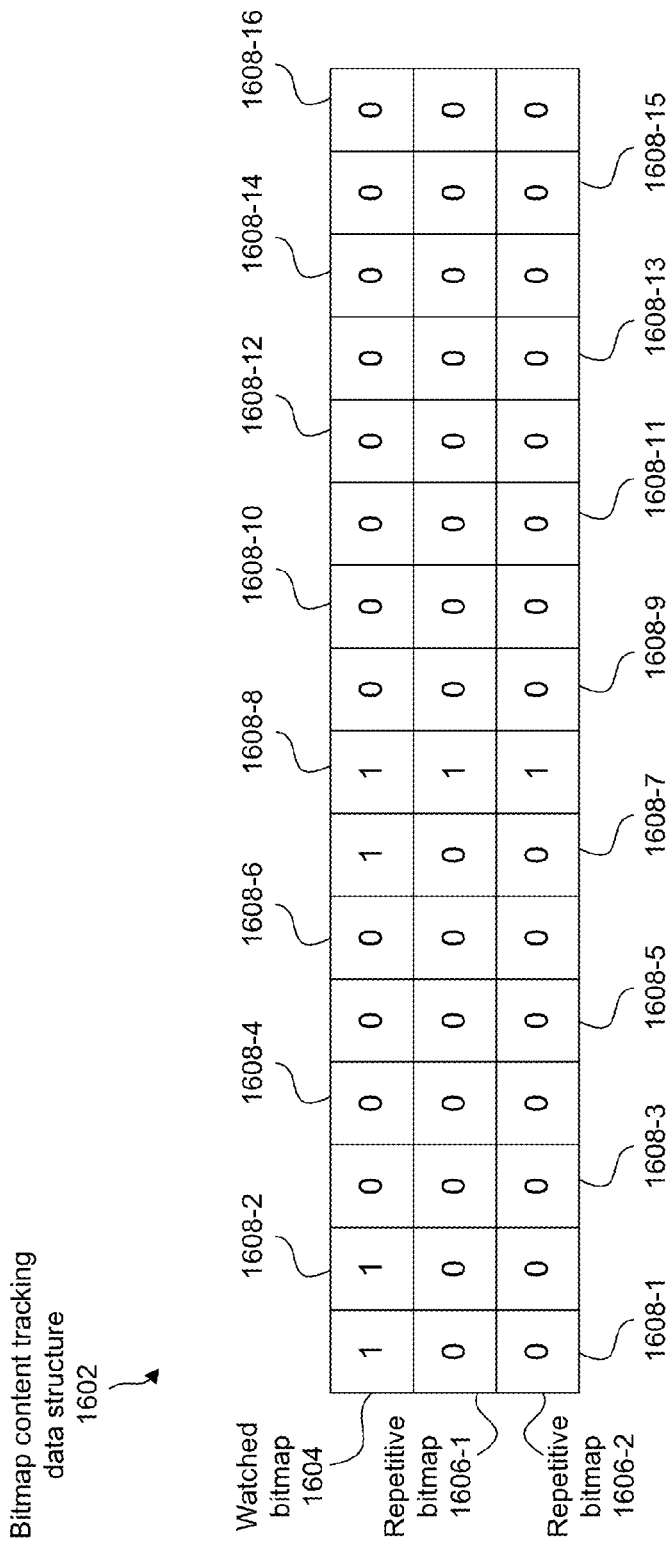
FIG. 16 illustrates an example bitmap content tracking data structure corresponding to the example tree content tracking data structure of FIG. 7, according to some embodiments.

In some embodiments, the topmost level (that is, level 0 in the example of FIG. 7) represents the entire video. If any part of the video is displayed to the user on the user's display device 112, then the bit at level 0 is set to 1. Otherwise, it is set to 0. FIGS. 15 and 16 are used to illustrate such operation. FIG. 15 illustrates example content 1501 that has 16 segments labeled 1503-1 through 1503-16. FIG. 16 illustrates example bitmap content tracking data structure 1602 that operates in the same manner as the example shown in FIG. 6. In the example of FIG. 16, the watched bitmap 1604 indicates that segments 1503-1, 1503-2, 1503-1 and 1503-8 of content 1501 were presented to the user on display device 112. The repetitive bitmaps 1606-1 and 1606-2 indicate that segment 1503-8 was displayed to the user a total of 3 times.

The example tree 702 shown in FIG. 7 corresponds to the example of FIGS. 15 and 16. Accordingly, at level 0 of the tree 702, the bit is set to 1 because at least some of content 1501 was displayed to user on display device 112.

In some embodiments, each successive level of the tree 702 divides the prior level in half, and indicates whether any part of those halves (respectively associated with segments 1503 in content 1501) were displayed to the user on display device 112. Thus, the left bit 704 in level 1 corresponds to segments 1503-1 to 1503-8 of content 1501. As shown in FIG. 16, at least some of these segments 1503-1 to 1503-8 were displayed to user. Thus, the bit 704 is set to 1 (as shown in the example of FIG. 7). The right bit 706 in level 1 corresponds to segments 1503-9 to 1503-16 of content 1501. As shown in FIG. 16, none of these segments 1503-9 to 1503-16 were displayed to user. Thus, the bit 706 is set to 0. In some embodiments, bits in tree 702 having a value of zero terminates that branch of the tree 702.

Level 2 of tree 702 has left bit 708 corresponding to segments 1503-1 to 1503-4 of content 1501, and right bit 710 corresponding to segments 1503-5 to 1503-8. As shown in FIG. 16, at least some of segments 1503-1 to 1503-4 and some of segments 1503-5 to 1503-8 were displayed to user. Thus, both bits 708 and 710 are set to 1.

In a similar manner, tree 702 continues to level 3 and level 4. Consider bit 726 in level 4. As will be apparent to persons skilled in the relevant arts based on the above discussion, this bit 726 corresponds to segment 1503-8 in content 1501. As indicated by the repetitive bitmaps 1606-1 and 1606-2 in FIG. 16, this segment 1503-8 was displayed to the user 3 times. Thus, bit 726 is set to 3, as shown in the example of FIG. 7.

Element 404—Tracking User GUI Navigation Patterns

Figure 8:
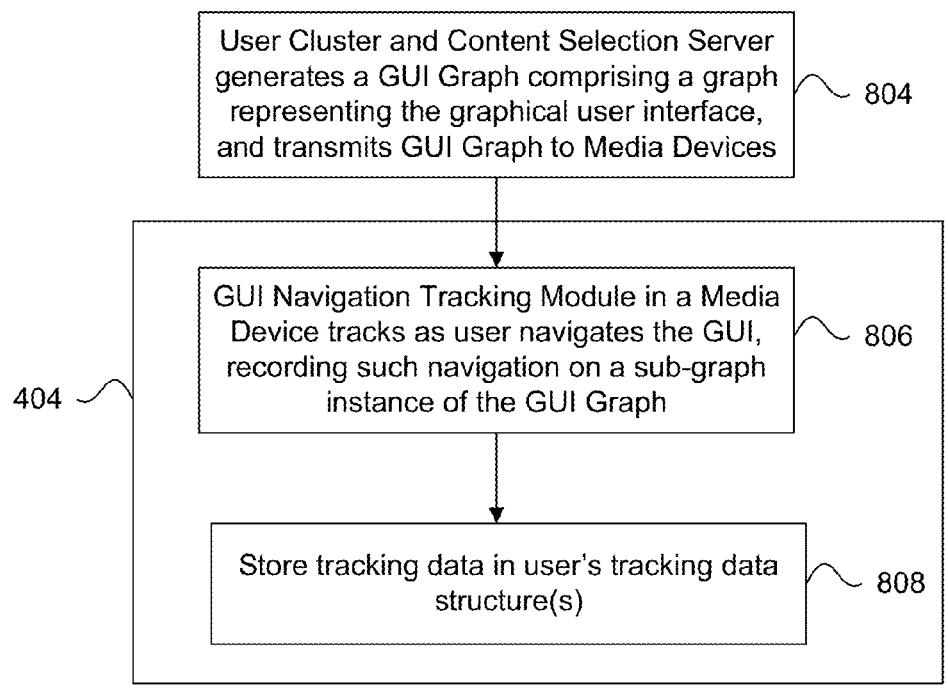
FIG. 8 illustrates a method for fine grain tracking and logging of a user's graphic user interface (GUI) navigation patterns, according to some embodiments.

FIG. 8 illustrates a flowchart 802 representing 404 of FIG. 4 in greater detail, according to some embodiments where user GUI navigation patterns are tracked. In 804, the user cluster and content selection server 120 generates a graph representing the GUI that is presented to the user on display device 112, and navigated by the user to select content for viewing. The user cluster and content selection server 120 may provide this GUI graph to the media servers 114 in the user systems 110.

Figure 9:
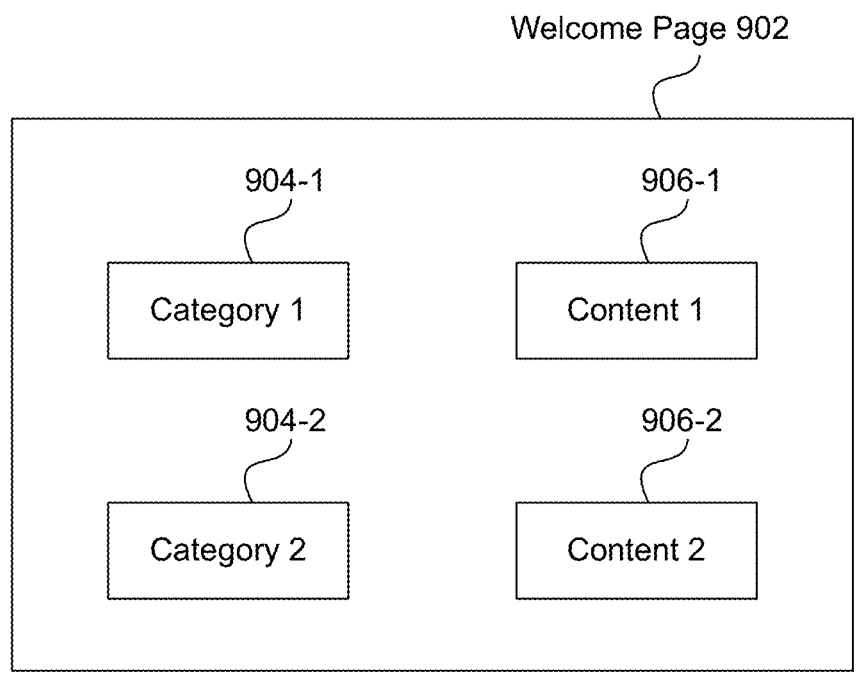
FIGS. 9-11 illustrate example GUI screen shots generated by a streaming media device, according to some embodiments.
Figure 10:
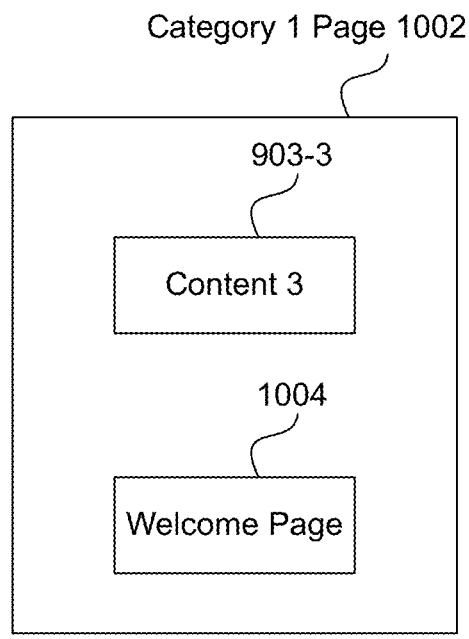
Figure 11:
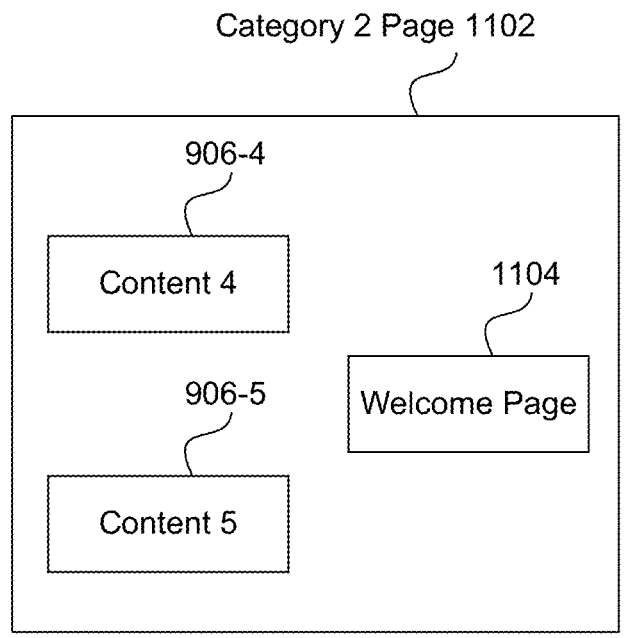

FIGS. 9, 10 and 11 illustrate an example GUI. FIG. 9 illustrates a welcome page 902 of the GUI that includes Content 1 button 906-1 and Content 2 button 906-2. Selection of either Content 1 or 2 button 906-1, 906-2 by the user using remote control 116 causes the media device 114 to retrieve the corresponding content from content server(s) 130, and to display the retrieved content on the display device 112.

Welcome page 902 also has a Category 1 button 904-1 and a Category 2 button 904-2. Selection of the Category 1 button 904-1 by the user causes the GUI module 202 in the media device 114 to display a Category 1 page 1002, an example of which is shown in FIG. 10. Selection of the Category 2 button 904-2 by the user causes the GUI module 202 to display a Category 2 page 1102, an example of which is shown in FIG. 11. The Category 1 Page 1002 includes a Content 3 button 906-3 and a Welcome Page button 1004. Selection of the Content 3 button 906-3 by the user using remote control 116 causes the media device 114 to retrieve the corresponding content from content server(s) 130, and selection of the welcome page button 1004 by the user causes the GUI module 202 to redisplay the welcome page 902 on display device 112.

The Category 2 Page 1102 includes a Content 4 button 906-4, a Content 5 button 906-5 and a Welcome Page button 1104. Selection of the Content 4 button 906-4 or the Content 5 button 906-5 by the user using remote control 116 causes the media device 114 to retrieve the corresponding content from content server(s) 130, and selection of the welcome page button 1104 by the user causes the GUI module 202 to redisplay the welcome page 902 on display device 112.

Figure 12:
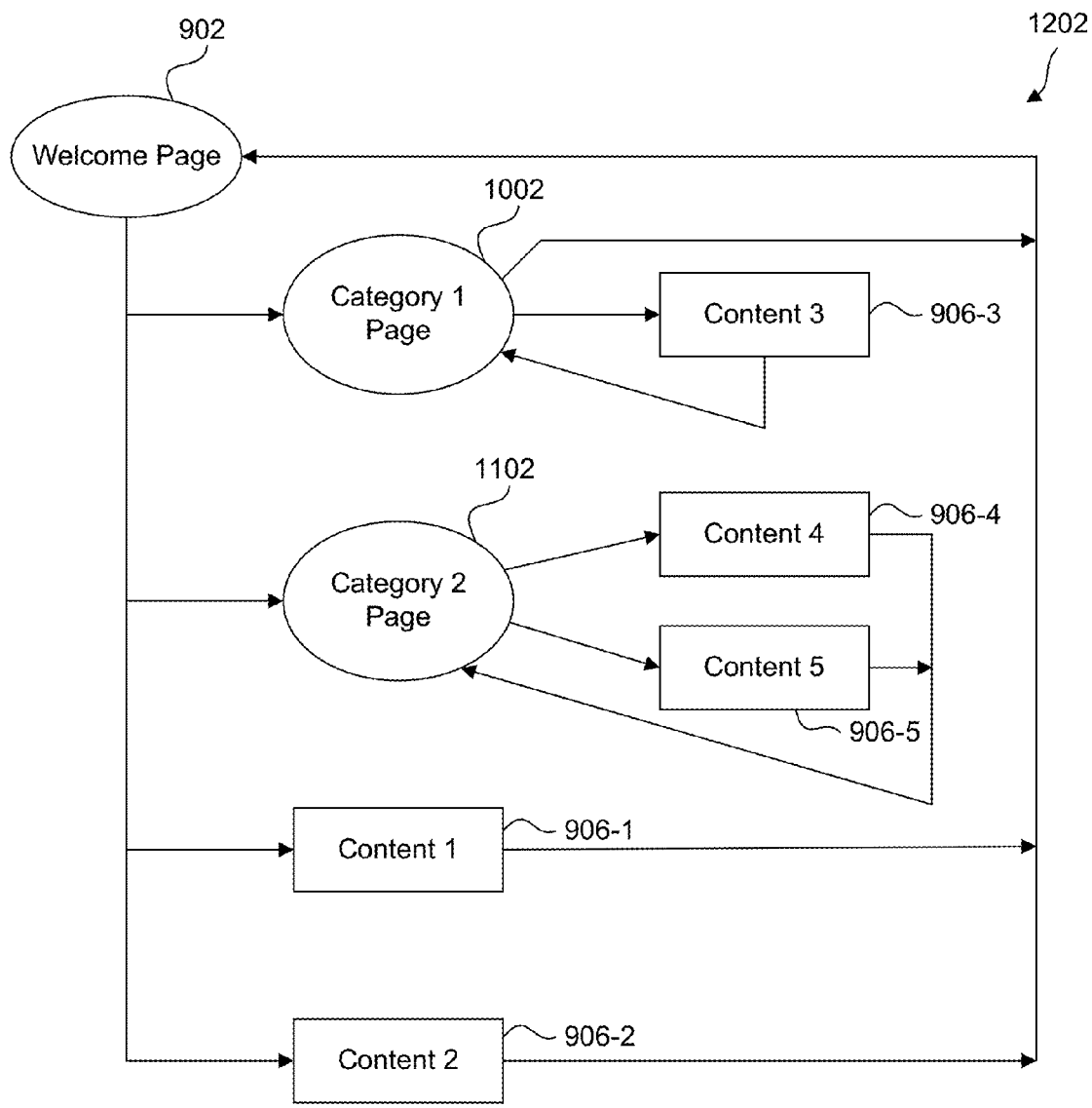
FIG. 12 illustrates an example GUI Graph corresponding to the example GUI screen shots of FIGS. 9-11, according to some embodiments.

Referring back to FIG. 8, the user cluster and content selection server 120 in 804 may generate a graph to represent the example GUI in FIGS. 9, 10 and 11, such as an example graph 1202 shown in FIG. 12. The graph 1202 includes a node for each button/tile/icon in the GUI pages 902, 1002, 1102, and links representing how the user may navigate between the pages of the GUI, as well as navigate to and select content for display on the display device 112. The user cluster and content selection server 120 may provide this GUI graph to the media servers 114 in the user systems 110.

Elements 806 and 808 of FIG. 8 represent operation of element 404, according to some embodiments. In 806, the GUI navigation tracking module 212 in the media device 114 tracks the user's navigation through the GUI. The user's navigation may include hovering over buttons in the GUI, selecting/clicking buttons in the GUI, moving between GUI pages, moving between nodes of the GUI, as well as any over user interface navigation functions. In embodiments, buttons in a GUI may include tiles, icons, buttons, etc.

The GUI navigation tracking module 212 records such navigation in a subset (or sub-graph) of the GUI graph, where the sub-graph reflects the user's navigation through the GUI. In some embodiments, such tracking is performed during a given navigation session of the user, which is defined as a time period when the user is actively engaged with the GUI. In some embodiments, the user's actively engagement with the GUI is defined as any sequence of UI interactions where any two consecutive UI interactions are separated by at most a defined time interval.

Figure 13:
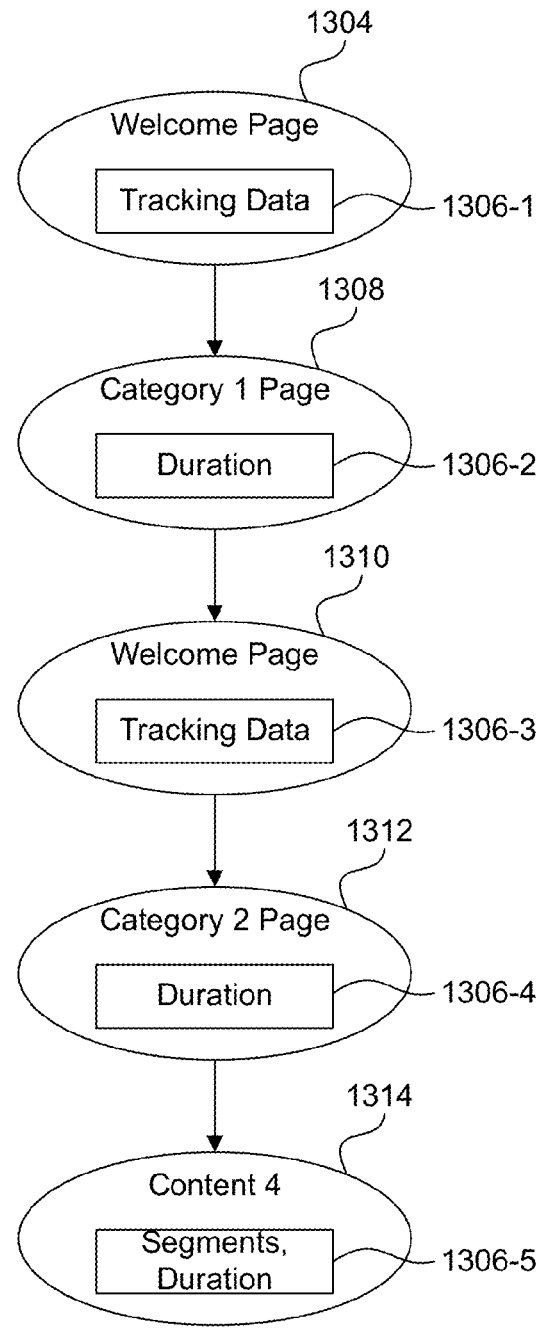
FIG. 13 illustrates an example data structure for recording a user's navigation through a GUI, according to some embodiments.

FIG. 13 illustrates a sub-graph 1302 reflecting a user's example navigation through a GUI, such as the example GUI 902, 1002, 1102 shown in FIGS. 9, 10 and 11. As reflected in this example sub-graph 1302, the user began at the welcome page 902 (node 1304), traversed to the Category 1 Page 1002 (node 1308), returned to the welcome page 902 (node 1310), navigated to the Category 2 Page 1102 (node 1312) and then selected Content 4 906-4 for display on the display device 112 (node 1314).

According to some embodiments, the nodes 1304, 1308, 1310, 1312, 1314 of the sub-graph 1302 may store tracking information 1306 representing characteristics of the user's navigation through the GUI's menu structure. For example, the nodes 1304, 1310 corresponding to the welcome page 902 may store tracking data 1306-1, 1306-3 indicating the menu tiles/icons the user hovered over, how long the user hovered, whether the user hovered more than once over a tile/icon, how long the user stayed on the welcome page 902, whether and how often the user scrolled to additional page(s) of the welcome page 902, to name a few examples.

In some embodiments, the nodes 1308, 1312 corresponding to other pages of the GUI menu where the user traversed to (such as Category 1 Page 1002 and Category 2 Page 1102 in the example of FIG. 13) may store duration information 1306-2, 1306-3 indicating how long the user stayed on the page. Also or alternatively, the nodes 1314 corresponding to content the user selected to display on display device 112 (such as Content 4 906-4 in the example of FIG. 13) may include information 1306-5 indicating the segments that were viewed, the duration of viewing (that is, whether the user watched the entire segment or just a portion thereof), segments the user viewed more than once, to name a few examples. It is noted that any node 1304, 1308, 1310, 1312, 1314 of the sub-graph 1302 may store any combination of the example tracking data discussed herein, or any other GUI tracking data deemed interesting by the system and/or user.

It noted that, in sub-graph 1302 of FIG. 13, the arrows between nodes 1304, 1308, 1310, 1312, 1314 indicate the order in which the user traversed through the GUI. In some embodiments, such ordering is also or alternatively provided by storing time stamps as part of tracking data 1306-1, 1306-3, where the time stamps indicate when the user hovered and/or clicked the associated button/tile/icon. The time stamps may be particularly useful in embodiments where information documenting the user's navigation through the GUI is stored in a list rather than as a sub-graph 1302. The time stamps may be either absolute or relative. An absolute time stamp may comprise the system clock value when the user hovered and/or clicked the associated button/tile/icon. A relative time stamp may comprise a counter value that is incremented by 1 as the user moves from one button/tile/icon to another, or hovers over or clicks a button/tile/icon, such that the relative time stamps reflect the ordering of the user's navigation through buttons/tiles/icons of the GUI (for example, which button/tile/icon the user hovered or clicked $1^{st}$ $2^{nd}$, $3^{rd}$, etc.)

Referring back to FIG. 4, in 406, the media device 114 may periodically transmit user tracking data 216, 218 to the user cluster and content selection server 120. For example, user behavior module 208 may transmit the content tracking data 216 and/or the GUI navigation tracking data 218 from database 214 to user cluster and content selection server 120 over the network 150. The processing module 126 in the user cluster and content selection server 120 may store the received content tracking data 216 and GUI navigation tracking data 218 in user behavior database 122. This transmission may occur periodically, where the period may be defined by the user and/or the user cluster and content selection server 120. For example, and without limitation, the period may be set to every hour, every 12 hours, daily, weekly, etc. The period may be set by the user or the system.

In 408, cluster module 128 of the user cluster and content selection server 120 may determine if the user should be added or removed from any clusters. In an embodiment, cluster module 128 may perform this operation by comparing the user's content tracking data 216 and/or GUI navigation tracking data 218 in user behavior database 122 to cluster profiles 304 associated with existing clusters 302 to determine a distance (such as a similarity and/or a difference) between the user's tracking data 216, 218 and the cluster profiles 304 of the existing user clusters 302. In an embodiment, greater or lesser weight may be provided to different aspects of the comparison.

An example of comparing the user's content tracking data 216 in 408 shall now be further described with respect to FIG. 14 that illustrates an example content tracking bit map 1402-1 for a user. The content tracking bit map 1402-1 reflects the segments of a content (such as a movie) displayed to the user according to an example scenario. FIG. 14 also illustrates an example bit map 1402-2 that represents the profile 304 of an existing user cluster 302 in this example scenario.

In an embodiment, the bit map 1402-2 of the profile 304 may comprise the bit map 602 of a select user in the cluster 302. In another embodiment, the bit map 1402-2 of the cluster profile 304 may have been generated using the bit maps 602 of any combination of users in the cluster 302. For example, assume there are 5 users in a cluster, and a particular segment of a movie was displayed to 3 of the users. In that case, given that the majority (3 out of 5), the user cluster and content selection server 120 may have set the corresponding bit in the cluster profile bit map 1402-2 to 1. If instead there was a minority, that is, the segment had been displayed to less than 3 users, then the corresponding bit may have been set to 0.

In some embodiments, and with respect to the example of FIG. 14, the cluster module 128 in 408 may perform a bit-by-bit comparison of the user bit map 1402-1 and the cluster profile bit map 1402-2 to determine the distance between the two (that is, the similarity and/or difference). In the example of FIG. 14, the cluster module 128 in 408 would find a similarity of 2 for the watched bitmaps 1404-1 and 1404-2 (that is, bits 1408-2 and 1408-4), and a difference of 2 (that is, bits 1408-1 and 1408-3).

Accordingly, for the watched bitmaps 1404-1 and 1404-2, the distance determination may take into account both watched and skipped segments, as both reflect user viewing patterns. In contrast, for the repetition bitmaps 1406-1 and 1406-2, the distance determination may take into account only the segments that were watched multiple times. This is the case because watching a segment multiple times may indicate greater interest in that segment. Given that greater interest, commonality in segments that were watched multiple times may indicate greater commonality between users. And, in some embodiments, given that potential for greater commonality, greater weight may be given to similarities with the repetition bitmaps 1406-1 and 1406-2 than with the watched bitmaps 1404-1, 1404-2.

With respect to the example of FIG. 14, the cluster module 128 in 408 may find an unweighted similarity of 1 for the repetition bitmaps 1406-1 and 1406-2 (bit 1410-2), and an unweighted difference of 3 (bits 1410-1, 1410-3, 1410-4). As noted above, in some embodiments, greater weight may be given to similarities with the repetition bitmaps 1406-1 and 1406-2 than with the watched bitmaps 1404-1, 1404-2. Accordingly, the combined similarity score may be W+n*R, where W is the similarity of the watched bitmaps 1404, R is the similarity of the repetition bitmaps 1406, and n is the weight. Assume this weight n is 3, although the weight may be set to other values by either the user or the system. For the example of FIG. 14, the combined similarity score is 2+3*1=5. The combined difference score is 2 (for the watched bitmaps 1404)+3 (for the repetition bitmaps 1406)=5, where in an embodiment both factors are provided the same weight for the difference determination.

As discussed above, in some embodiments, cluster module 128 may store user content viewing behavior in tree data structures 702. In such embodiments, the cluster module 128 in 408 may determine a distance between the user's content viewing patterns as reflected in a tree data structure 702 and the tree data structures 702 respectively associate with user clusters 302 (as represented by cluster profiles 304). In some embodiments, the cluster module 128 determines distances between trees by using well known algorithms to implement, singularly or in combination, the well known Levenshtein distance, the Wagner-Fischer distance, Damerau-Levenshtein distance, and/or the Hamming distance, to name a few examples. For example, the Levenshtein distance algorithm operates to determine the distance between two sequences, such as strings. When used in embodiments described in this patent document, the Levenshtein distance algorithm operates on graphs and/or trees rather than strings (or such graphs/trees are represented as strings which are then applied to the Levenshtein distance algorithm).

Alternatively or additionally, cluster module 128 may perform 408 by determining the distance between the user's GUI navigation patterns and the GUI navigation patterns associated with user clusters 302. As discussed above, in some embodiments, such GUI navigation patterns may be stored in sub-graphs (an example of which is shown in FIG. 13) or lists, as discussed above. Accordingly, in 408, the cluster module 128 compares the user's sub-graph with the sub-graphs respectively associated with user clusters 302 (as represented by cluster profiles 304) to determine the distances there between. In some embodiments, the cluster module 128 may use any well-known algorithm to determine the distance between sub-graphs. For example, the cluster module 128 may perform this function using any well known algorithms to implement, singularly or in combination, the well known Levenshtein distance, the Wagner-Fischer distance, Damerau-Levenshtein distance, and/or the Hamming distance (to name just a few examples), as discussed above.

In 410, cluster module 128 may add the user to clusters 302 where the distance (that is, the similarity and/or difference) determined in 408 satisfies an "add" threshold value(s) respectively associated with the clusters. The add threshold value can be set by the user or the system, such as by the user cluster and content selection server 120. In some embodiments, the add threshold value may be set based on whether close or loose coupling is desired between the user and a cluster 302 is desired, in order for the user to be added to the cluster 302. For example, where the distance is represented by a difference value, then the add threshold value may be set to 0 or a number relatively close to 0 if it is desired that the user be added to a cluster 302 only if there is little or no difference between the user and the cluster. In contrast, the add threshold value may be set to a greater value if it is acceptable that the user be added to a cluster 302 even though there are differences between the user and cluster 302. This latter approach may be desirable, for example, to enable the user to be added to more clusters 302 for the purpose of being able to provide the user with a greater number of content recommendations.

In 412, cluster module 128 may remove the user from clusters 302 (where the user is currently a member) where the distance (that is, the similarity and/or difference) determined in 408 does not satisfy a "remove" threshold value(s) respectively associated with the clusters 302. The remove threshold value can be set by the user or the system, such as by the user cluster and content selection server 120. In some embodiments, the remove threshold value is set depending on how close a user must be to a cluster 302 in order to remain in the cluster 302. For example, where the distance is represented by a similarity value, then the remove threshold value may be set to a relatively greater value if it is desired that the user only remain in clusters 302 when there is greater similarity between the user and the clusters 302. In contrast, the remove threshold value may be set to a relatively lesser value if it is permissible that the user remain in clusters 302 even when there is lesser similarity between the user and the clusters.

In 414, cluster module 128 may update the cluster profiles 304 of the clusters 302 that the user was added to (in 410) and deleted from (in 412) to reflect the user's respective addition and deletion. For example, consider the case where user viewing behavior patterns are recorded in bit maps 1402, and assume there are 6 users in a cluster 302. Further assume a particular segment of a movie was displayed to 3 of the users in the cluster 302. Given the majority (3 out of 6, with ties being considered a majority), the corresponding bit in the profile bit map 1402-2 would have previously been set to 1. Now assume the user in question was added to the cluster in 410 (so now there are 7 users in the cluster), and the movie was displayed to the user. In this case, the movie segment would have been displayed to 4 of the 7 users in the cluster; given the majority, the cluster module 128 in 414 would maintain the bit in the cluster profile bit map 1402-2 as 1. In contrast, assume the user in question was instead removed from the cluster in 412 (so now there are 5 users in the cluster), and the movie had been displayed to the user. In this case, the movie segment would have been displayed to 2 of the 5 remaining users in the cluster; given the minority, the cluster module 128 in 414 would set the bit in the cluster profile bit map 1402-2 to 0.

In 416, the content selection module 140 generates content recommendations for the user based on the user's membership in cluster(s) 302 (called "membership clusters"). For example, in some embodiments, the content selection module 140 in 416 may recommend content that were previously displayed to other users in the membership clusters. In some embodiments, those recommendations may or may not include recommendations to content already displayed to the user. The user cluster and content selection server 120 in 416 provides such recommendations to the media device 114 in the user system 110 associated with the user over network 150.

In 418, the GUI module 202 in the user's media device 114 displays such content recommendations to the user on the associated display device 112.

In other embodiments, media devices 114 and/or user cluster content selection server 120 may use user clusters 302 to further customize a user's viewing experience at his respective user system 110 in addition to or instead of the recommendation of content. For example, based on the behavior of other users in the membership clusters 302 (that is, the clusters 302 where the user in question is a member), media devices 114 and/or user cluster content selection server 120 can adjust audio and video settings, select channels, set close captioning settings, etc., for the user when viewing content on his associated display device 112.

In some embodiments, user behavior characteristics beyond the examples described above may be tracked. For example, navigating some contents—such as a movie—may be somewhat similar to navigating a UI. For example, with a movie, the user may navigate forward (in real time, or slower/faster than real time), or backward. Thus, some embodiments track not just the segments of a movie that was watched, and how often they were watched, but also other information, such as the sequence the segments were watched, the segments that were watched in slow motion, the segments that were fast forwarded through, the segments that were rewinded in slow motion, etc. By tracking such information, embodiments may be able to capture more detailed profiles of users, and thus may be able to cluster users on a finer, deeper scale.

Example Computer System

Figure 17:
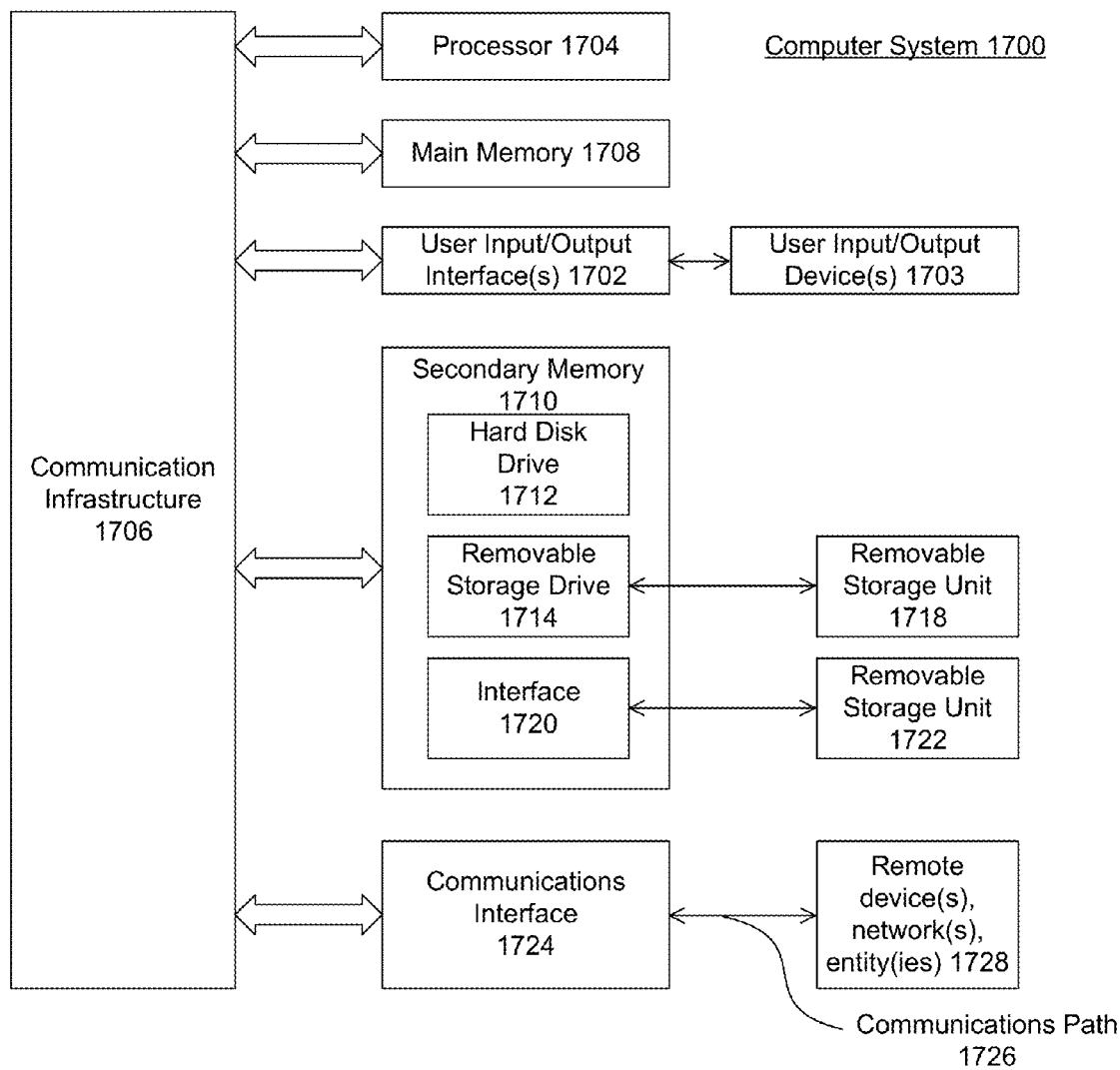
FIG. 17 illustrates an example computer system useful for implementing various embodiments.

Various embodiments and/or components therein can be implemented, for example, using one or more computer systems, such as computer system 1700 shown in FIG. 17. Computer system 1700 can be any computer or computing device capable of performing the functions described herein.

Computer system 1700 includes one or more processors (also called central processing units, or CPUs), such as a processor 1704. Processor 1704 is connected to a communication infrastructure or bus 1706.

One or more processors 1704 can each be a graphics processing unit (GPU). In some embodiments, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 1700 also includes user input/output device(s) 1703, such as monitors, keyboards, pointing devices, etc., that communicate with communication infrastructure 1706 through user input/output interface(s) 1702.

Computer system 1700 also includes a main or primary memory 1708, such as random access memory (RAM). Main memory 1708 can include one or more levels of cache. Main memory 1708 has stored therein control logic (i.e., computer software) and/or data.

Computer system 1700 can also include one or more secondary storage devices or memory 1710. Secondary memory 1710 can include, for example, a hard disk drive 1712 and/or a removable storage device or drive 1714. Removable storage drive 1714 can be a floppy disk drive, a magnetic tape drive, a compact disk drive, an optical storage device, tape backup device, and/or any other storage device/drive.

Removable storage drive 1714 can interact with a removable storage unit 1718. Removable storage unit 1718 includes a computer usable or readable storage device having stored thereon computer software (control logic) and/or data. Removable storage unit 1718 can be a floppy disk, magnetic tape, compact disk, DVD, optical storage disk, and/any other computer data storage device. Removable storage drive 1714 reads from and/or writes to removable storage unit 1718 in a well-known manner.

According to an exemplary embodiment, secondary memory 1710 can include other means, instrumentalities or other approaches for allowing computer programs and/or other instructions and/or data to be accessed by computer system 1700. Such means, instrumentalities or other approaches can include, for example, a removable storage unit 1722 and an interface 1720. Examples of the removable storage unit 1722 and the interface 1720 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1700 can further include a communication or network interface 1724. Communication interface 1724 enables computer system 1700 to communicate and interact with any combination of remote devices, remote networks, remote entities, etc. (individually and collectively referenced by reference number 1728). For example, communication interface 1724 can allow computer system 1700 to communicate with remote devices 1728 over communications path 1726, which can be wired and/or wireless, and which can include any combination of LANs, WANs, the Internet, etc. Control logic and/or data can be transmitted to and from computer system 1700 via communication path 1726.

In some embodiments, a tangible apparatus or article of manufacture comprising a tangible computer useable or readable medium having control logic (software) stored thereon is also referred to herein as a computer program product or program storage device. This includes, but is not limited to, computer system 1700, main memory 1708, secondary memory 1710, and removable storage units 1718 and 1722, as well as tangible articles of manufacture embodying any combination of the foregoing. Such control logic, when executed by one or more data processing devices (such as computer system 1700), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 17. In particular, embodiments can operate with software, hardware, and/or operating system implementations other than those described herein.

CONCLUSION

It is to be appreciated that the Detailed Description section, and not the Summary and Abstract sections, is intended to be used to interpret the claims. The Summary and Abstract sections can set forth one or more but not all exemplary embodiments of the invention as contemplated by the inventors, and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of the invention should not be limited by any of the above-described exemplary embodiments, but should be defined only in accordance with the following claims and their equivalents.

What is claimed is:

1. A system comprising:
   at least one processor; and
   a memory operatively coupled to the at least one processor, the processor configured to:
      cluster a user into one or more groups of users based on both a graph data structure indicating how the user interacted with a menu structure for selecting content and a bitmap data structure indicating how the user interacted with content selected from the menu structure;
      receive tracking data for a user comprising:
         the graph data structure comprising user interface (UI) navigation behavior information of the user between different icons of the menu structure for selecting content, wherein the tracking data of the graph data structure comprises an indication of over which icon of the menu structure the user hovered without selecting and how long the user hovered;
         the bitmap data structure comprises a bit for each of a plurality of segments of the selected content available for viewing, wherein each bit of the bitmap data structure indicates whether the segment was viewed by the user;
      determine a distance between the tracking data and a cluster profile associated with a user cluster;
      determine the distance satisfies a threshold associated with the user cluster;
      add the user to the user cluster, in response to determining the distance satisfies the threshold associated with the user cluster;
      generate content recommendations based on content previously displayed to other users in the user cluster; and
      cause the content recommendations to be provided to the user.

2. The system of claim 1, wherein the processor is further configured to:
   receive additional tracking data for the user;
   determine a distance between the additional tracking data and a cluster profile associated with a second user cluster, wherein the user is an existing member of the second user cluster;
   determine the distance between the additional tracking data and the cluster profile associated with the second user cluster does not satisfy a threshold associated with the second user cluster; and
   remove the user from the second user cluster, in response to determining the distance between the additional tracking data and the cluster profile associated with the second user cluster does not satisfy the threshold associated with the second user cluster.

3. The system of claim 1, wherein the processor is further configured to:
   update the cluster profile based on the addition of the user to the user cluster.

4. The system of claim 1, wherein the tracking data comprises content viewing behavior information of the user stored in a tree data structure.

5. The system of claim 1, wherein the graph data structure comprises a plurality of nodes, wherein at least some of the nodes correspond to a welcome page and each node stores one or more of information indicating menu tiles/icons the user hovered over, information indicating how long the user hovered, information indicating whether the user hovered more than once over a tile/icon, information indicating how long the user stayed on the welcome page, and information indicating how often the user scrolled to additional pages of the welcome page.

6. The system of claim 1, wherein the bitmap data structure comprises a separate bitmap for each time a particular segment of the selected content was viewed.

7. The system of claim 1, wherein a group bitmap data structure comprises a separate bitmap for each time a particular segment of the selected content was viewed by a majority of users that comprise the group.

8. A computer implemented method, comprising:
   clustering a user into one or more groups of users based on both a graph data structure indicating how the user interacted with a menu structure for selecting content and a bitmap data structure indicating how the user interacted with content selected from the menu structure;
   receiving tracking data for a user comprising:
      the graph data structure comprising user interface (UI) navigation behavior information of the user between different icons of the menu structure for selecting content, wherein the tracking data of the graph data structure comprises an indication of over which icon of the menu structure the user hovered without selecting and how long the user hovered;
      the bitmap data structure comprises a bit for each of a plurality of segments of the selected content available for viewing, wherein each bit of the bitmap data structure indicates whether the segment was viewed by the user;
   determining a distance between the tracking data and a cluster profile associated with a user cluster;
   determining the distance satisfies a threshold associated with the user cluster;
   adding the user to the user cluster, in response to determining the distance satisfies the threshold associated with the user duster;
   generating content recommendations based on content previously displayed to other users in the user cluster; and
   causing the content recommendations to be provided to the user.

9. The method of claim 8, further comprising:
   receiving additional tracking data for the user;
   determining a distance between the additional tracking data and a cluster profile associated with a second user duster, wherein the user is an existing member of the second user cluster;
   determining the distance between the additional tracking data and the duster profile associated with the second user cluster does not satisfy a threshold associated with the second user cluster; and
   removing the user from the second user cluster, in response to determining the distance between the additional tracking data and the cluster profile associated with the second user cluster does not satisfy the threshold associated with the second user duster.

10. The method of claim 8, further comprising:
    updating the duster profile based on the addition of the user to the user cluster.

11. The method of claim 8, wherein the tracking data comprises content viewing behavior information of the user stored in a tree data structure.

12. The method of claim 8, wherein the graph data structure comprises a plurality of nodes, wherein at least some of the nodes correspond to a welcome page and each node stores one or more of information indicating menu tiles icons the user hovered over, information indicating how long the user hovered, information indicating whether the user hovered more than once over a tile/icon, information indicating how long the user stayed on the welcome page, and information indicating how often the user scrolled to additional pages of the welcome page.

13. A non-transitory; tangible computer-readable device having instructions stored thereon that, when executed by at least one computing device, causes the at least one computing device to perform operations comprising:
   clustering a user into one or more groups of users based on both a graph data structure indicating how the user interacted with a menu structure for selecting content and a bitmap data structure indicating how the user interacted with content selected from the menu structure;
   receiving tracking data for a user comprising:
      the graph data structure comprising user interface (UI) navigation behavior information of the user between different icons of the menu structure for selecting content, wherein the tracking data of the graph data structure comprises an indication of over which icon of the menu structure the user hovered without selecting and how long the user hovered;
      the bitmap data structure comprises a bit for each of a plurality of segments of the selected content available for viewing, wherein each bit of the bitmap data structure indicates whether the segment was viewed by the user;
   determining a distance between the tracking data and a cluster profile associated with a user cluster;
   determining the distance satisfies a threshold associated with the user cluster;
   adding the user to the user cluster, in response to determining the distance satisfies the threshold associated with the user cluster;
   generating content recommendations based on content previously displayed to other users in the user duster; and
   causing the content recommendations to be provided to the user.

14. The non-transitory, tangible computer-readable device of claim 13, the operations further comprising:
   receiving additional tracking data for the user;
   determining a distance between the additional tracking data and a cluster profile associated with a second user cluster, wherein the user is an existing member of the second user cluster;
   determining the distance between the additional tracking data and the cluster profile associated with the second user cluster does not satisfy a threshold associated with the second user cluster; and
   removing the user from the second user cluster, in response to determining the distance between the additional tracking data and the cluster profile associated with the second user cluster does not satisfy the threshold associated with the second user cluster.

15. The non-transitory, tangible computer-readable device of claim 13, wherein the tracking data comprises content viewing behavior information of the user stored in a tree data structure.

16. The non-transitory, tangible computer-readable device of claim 13, wherein the graph data structure comprises a plurality of nodes, wherein at least some of the nodes correspond to a welcome page and each node stores information indicating menu tiles/icons the user hovered over, information indicating how long the user hovered, information indicating whether the user hovered more than once over a tile/icon, information indicating how long the user stayed on the welcome page, and information indicating how often the user scrolled to additional pages of the welcome page.

* * * * *